(12) United States Patent
Tsuchinaga

(10) Patent No.: US 6,320,834 B1
(45) Date of Patent: Nov. 20, 2001

(54) DATA DEMODULATING METHOD AND OPTICAL DISK DEVICE USING THE METHOD

(75) Inventor: Hiroyuki Tsuchinaga, Kodaira (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/702,672

(22) Filed: Nov. 1, 2000

Related U.S. Application Data (62) Division of application No. 09/149,223, filed on Sep. 4, 1998.

(30) Foreign Application Priority Data

Sep. 5, 1997 (JP) .................................................. 9-240679

(51) Int. Cl.[7] .................................................. G11B 7/00
(52) U.S. Cl. ............................. 369/59.21; 369/47.28
(58) Field of Search ........................... 369/59.21, 59.22, 369/59.19, 59.15, 59.1, 53.1, 47.1, 47.28, 47.35, 44.23, 44.28, 44.29, 44.34

(56) References Cited

U.S. PATENT DOCUMENTS 5,689,493 * 11/1997 Kawasaki ........................ 369/44.23
6,091,685 * 7/2000 Kim ................................. 360/59.1

FOREIGN PATENT DOCUMENTS

| 62-254514 | 11/1987 | (JP) . |
| 2-81324 | 3/1990 | (JP) . |
| 8-212718 | 8/1996 | (JP) . |
| 8-263943 | 10/1996 | (JP) . |

* cited by examiner

*Primary Examiner*—Muhammad Edun
(74) *Attorney, Agent, or Firm*—Mattingly, Stanger & Malur, P.C.

(57) ABSTRACT

A reproduced signal 104 is sampled with a half-frequency clock signal to set two threshold levels 107, 108 for a sub-sampled data string 105, and the sub-sampled data string 105 is determined to be at three levels to produce an intermediate value data string 109. A modulo-2 operation is performed on the intermediate data string 109 to determine the data of the sub-sampled data string 105, and the data of a non-sampled data string 106 are decided with the state transition of the sub-sampled data string 105 to acquire reproduced data 112.

3 Claims, 11 Drawing Sheets

(a) sampling timing is early (b) sampling timing is proper (c) sampling timing is late

DATA DEMODULATING METHOD AND OPTICAL DISK DEVICE USING THE METHOD

This is a divisional application U.S. Ser. No. 09/149,223, filed Sep. 4, 1998.

FIELD OF THE INVENTION

The present invention relates to a demodulating method suitable for reproducing digital data signals, as recorded on an optical disk, and an optical disk device using the method.

BACKGROUND OF THE INVENTION

One method far recording/reproducing information data as a pit train on/from an optical disk, is one in which data having a value of [1], for example, are recorded corresponding to the leading edge or trailing edge of a pit and in which the original data are reproduced by detecting these edge positions within a reproduced signal waveform. This mark edge recording method can be used to make a higher density recording than a "pit position" method in which the pits are recorded to correspond to the data [1] irrespective of pit edges.

The data recording/reproducing method by the mark edge recording method will be described with reference to FIG. 15. Here, the description will be made corresponding to the case in which the user data are modulated by the encoding method having the minimum run length such as a (2, 7) RLL modulation at 2. If the decode window is indicated by T, the smallest pit length and space length are at 3T. Moreover, it is assumed that the reproduced channel characteristics to be determined by the optical disk and the reading optical spot are PR (1, 2, 3, 3, 2, 1). This implies that when a data string "---0001000---" are recorded in the optical disk, the reproduced response waveform takes a format of "---01233210---". When the encoding method having the minimum run length at 2 is adopted, the level of the reproduced signal to be taken at a data recognition point is understood to take eleven levels of 0, 1, 2, 3, 4, 6, 8, 9, 10, 11 and 12 by superposing the PR (1, 2, 3, 3, 2, 1) characteristic. The levels 5 and 7 do not appear due to the run-length limitation.

Figure 14:
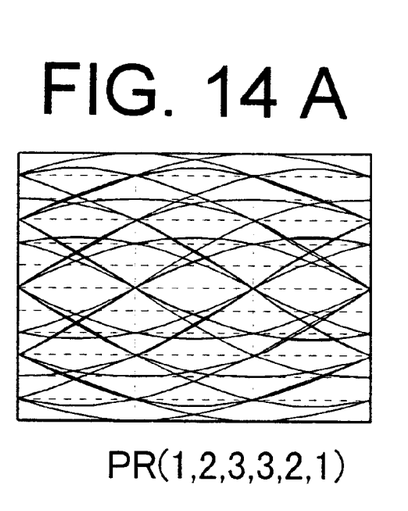
FIGS. 14A–14D show different eye pattern modes due to differences in reproduced channel characteristics.

If similar operations are performed for a random pattern, there is obtained an eye pattern, as shown in FIG. 14(_a_). The PR (1, 2, 3, 3, 2, 1) characteristic has a wide range of response waveform so that the eye takes a small opening height. This eye pattern is prominently different from eye patterns of the PR (1, 3, 3, 1) characteristic, the PR (1, 2, 2, 1) characteristic and the PR (1, 2, 1) characteristic, as shown at (b), (c) and (d) in FIG. 14. In any of these cases, however, the edge positions, as obtained by slicing at the center level, are concentrated at one point so that the data can be reproduced by detecting the edge position.

By inverting the polarity of recording data 2001 with the data [1], a recording data pulse train 2002 is obtained. By subjecting this pulse train 2002 to a (not-shown) suitable recording waveform control, a recording mark train 2003 is recorded on the disk. By scanning the recording mark with a reading optical spot, a reproduced signal 2004 is obtained. This reproduced signal 2004 is made binary as pulses 2006 along a suitable slice level 2005. At the timings of the rising and falling edges of the binary pulses 2006, a pulse signal 2007 is obtained. This pulse signal 2007 is fed to a PLL circuit (i.e., a phase locked loop circuit, not shown) so that a synchronized clock signal 2008 is outputted from the PLL circuit. As shown, the rising edge of the pulse signal 2007 and the rising edge of the lock signal 2008 are synchronized.

By latching the pulse signal 2007 with the falling edge of the clock signal 2008, read data pulses 2009 are obtained. If the read data are made to correspond to the data [1] when the read data pulses 2009 are at "H", there are obtained reproduced data which are identical to the recording data.

There has also been proposed another method. The pulse signal 2007 is divided into rising/falling pulse trains, and these pulse trains are operated independently of each other. After this, the leading edge data and the trailing edge data are recomposed by absorbing their timing discrepancy with a synchronous pattern. Japanese Patent Laid-Open No. 212718/1996 is enumerated as prior art of this kind.

A conventional method other than the data recording/reproducing method shown in FIG. 15 will be described with reference to FIGS. 16 and 17. The operations corresponding to obtaining a recording data pulse train 2102 from recording data 2101 to that of obtaining a reproduced signal 2104 from a recording mark train 2103 are identical to those of FIG. 15. According to this method, the reproduced signal is sampled with a clock signal, and the edge data are extracted, while synchronizing the clock signal with the reproduced signal 2104, from the data of a sampled data train 2105. These operations will be described with reference to FIG. 17. A reproduced signal 2201 is sampled with a clock signal 2208 in an A/D converter 2202. The sampled data are cleared of the inter-symbol interference by a digital equalizer 2203 and are equalized according to the PR (1, 2, 3, 3, 2, 1) characteristic. After this, the sampled data are cleared of the amplitude fluctuation and the level fluctuation by an amplitude/level compensator 2204 and are fed to a data decider 2205. These operations are wholly carried out in synchronism with the clock signal 2208. The sampled data 2209, having passed through the amplitude/level compensator 2204, are fed to a phase comparator 2206, in which the sample timing discrepancy of the A/D conversion is detected in terms or a voltage, so that the clock signal 2208 is obtained by controlling the oscillation frequency of a VCO (Voltage Control Oscillator) 2207. In the data decider 2205, whether or not the sampled data are the edge data is decided with two threshold levels 2106 and 2107, and reproduced data 2210 are outputted. IN other words, reproduced data 2108 identical to the recording data 2101 are obtained by deciding the sampled data between those levels at [1] and the remaining data at [0].

Figure 15:
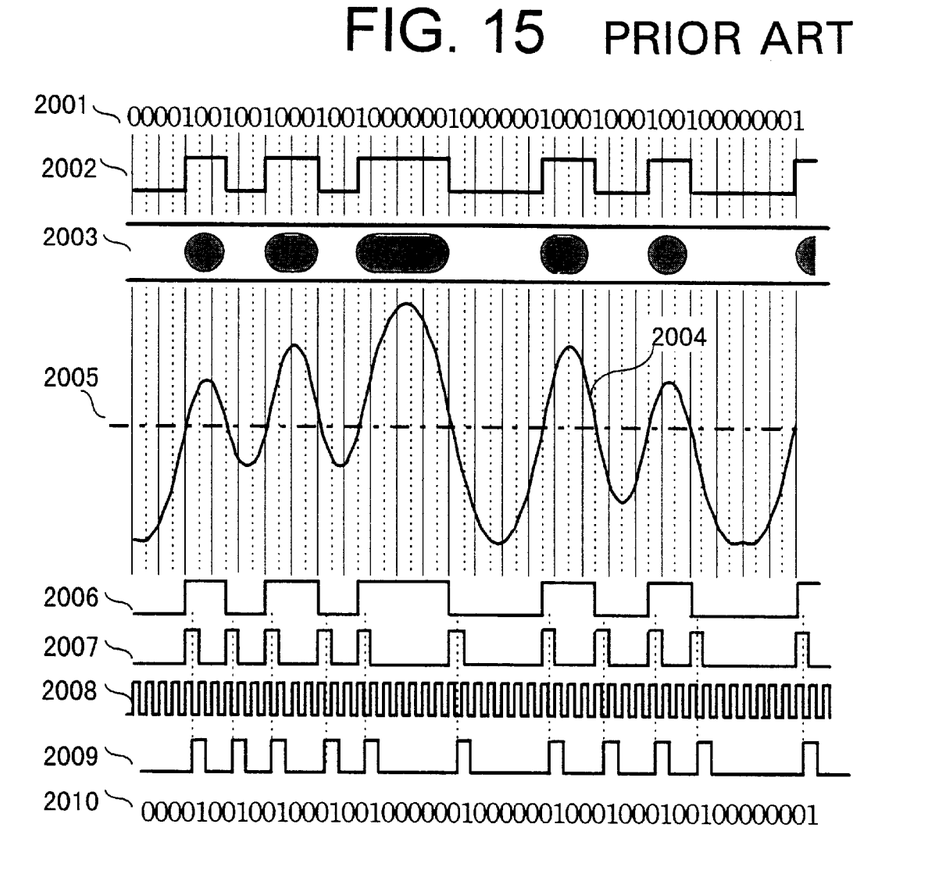
FIG. 15 is a diagram for explaining a concept of the data demodulating method in an analog method of the prior art.
Figure 16:
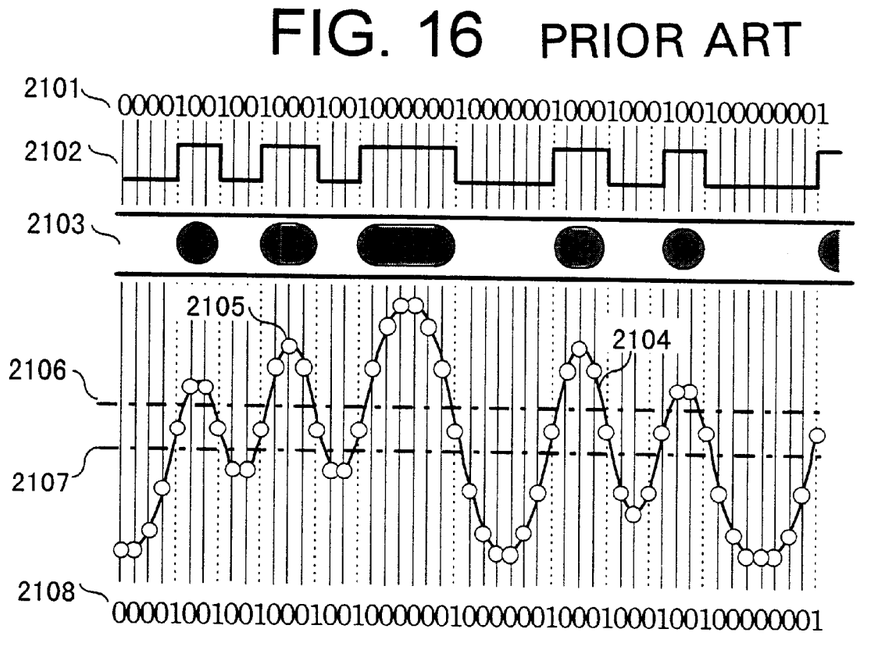
FIG. 16 is a diagram for explaining a concept of the data demodulating method in an digital method of the prior art.
Figure 17:
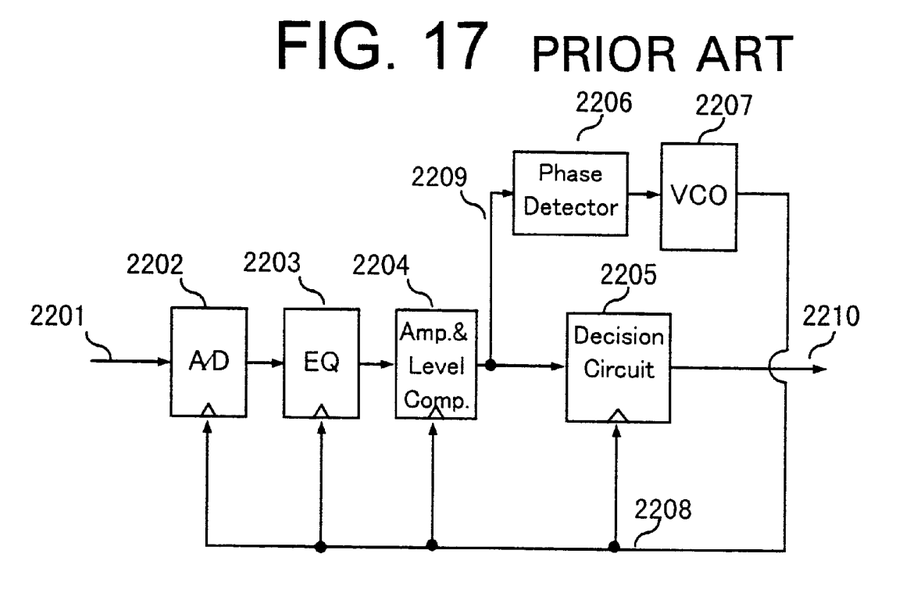
FIG. 17 is a block diagram for realizing the data demodulating method in the digital method of the prior art.

The method of FIG. 15 and the method of FIG. 16 will be discriminated by calling the former the analog operations and the latter the digital operations.

The prior art, as described with reference to FIGS. 15 and 16, are sensitive to the level fluctuation and the amplitude fluctuation of the reproduced signal. As means for improving the reliability, therefore, there has been devised a technique of compensating the slice level. The analog operations are disclosed in Japanese Patent Laid-Open No. 81324/1990 or No. 254514/1987, and the digital operations are disclosed in Japanese Patent Laid-Open No. 263943/1996.

SUMMARY OF THE INVENTION

In the prior art involving the analog operations, the data are detected from phase data using only the edge data. It is, therefore, anticipated that the necessary error factor is difficult to retain when the height of the eye opening is reduced with higher density, thereby lowering the SN ratio.

In the prior art involving the digital operations, on the other hand, the digital sampling that is employed for extracting edge data causes similar problems. In accordance with a rise in the transfer rate, the clock frequency rises limited by the processing speed to be realized by the actual circuit. This makes it necessary to enlarge the circuit scale by using parallel operations.

An object of the invention is to provide a method capable of reducing the increase in the circuit scale to a relatively small value and lowering the processing speed necessary for decisions in a data demodulation by digital processing, by using sampled data before and after edge data as the data to be used for decoding the recorded data.

In order to achieve the above specified object, means are provided for determining edge data from a sampled data string. Two thresholds are established to define a signal level indicative of a leading or trailing edge. A sample can be lower than, equal to (i.e. within the thresholds), or higher than the edge level. The sampled data are given a [1] value if they fall within the established thresholds, indicating an edge, or a value of [0] otherwise. In addition, transitions between successive samples are examined as being indicative of an edge occurring between sample points.

The sampling is performed in response to a half-frequency clock signal, resulting in sub-sampled data points. A ternary determination means is provided to decide whether or not the sub-sampled points are edge data, and a means is provided to decide whether or not intermediate, non-sampled data points are edge data. A demodulated data [1] is output when the sub-sampled data points are at the edge level. In addition, a demodulated [1] is output at a non-sampled point when successive sub-sampled data points transition from a level higher than the edge level to a level lower than the edge level, and vice-versa.

In order to effect the aforementioned means, there is also provided means for detecting the level fluctuation and the amplitude fluctuation of the reproduced signal digitally from a sampled data string and for compensating the detected signal with respect to the analog reproduced signal and the sampled data string.

In accordance with the mode of the optical disk, moreover, there is also provided a means for rapidly ending an acquisition mode of the aforementioned means by utilizing a specific pattern formed in the head portion of the recording data portion and for returning the mode to an ordinary mode for a disk of RAM (Random Access Memory) type, and means for switching an acquisition mode in a disk of ROM (Read Only Memory) type.

DETAILED DESCRIPTION OF THE PREFERRED EMBODIMENTS

A data demodulating method of a first embodiment of the invention will be described with reference to FIG. 1. Like the description of the prior art, here will be described the case in which user data is to be modulated by an encoding method where the minimum run length of the (2, 7) RLL or EFM (Eight To Fourteen) modulation or an 8/16 modulation is at 2. The reproduction channel characteristics, as determined by an optical disk and a read light spot, are assumed to be the PR (1, 2, 3, 3, 2, 1). Here, the invention can be likewise applied to the PR (1, 3, 3, 1) characteristic, PR (1, 2, 2, 1) characteristic and PR (1, 2, 1) characteristic, as shown at (b), (c) and (d) in FIG. 14, and so on. The invention can be further applied to an encoding method where the run length such as (1, 7) RLL is at 1, although its description will be omitted.

Recording data 101 are inverted in polarity at data [1] to produce a recording data pulse train 102. By subjecting the pulse train 102 to a (not-shown) suitable recording waveform control to modulate the laser power, a recording mark train 103 is recorded over the disk. By scanning the recording marks with a reading optical spot, a reproduced signal 104 s produced. The reproduced signal 104 is sampled with a half frequency clock signal that is generated from a system clock signal, for example a clock signal having a frequency like that of signal 2008, shown in FIG. 15, to produce a data string of sub-sampled data points 105 (●) Also, a data string 106 (○) is acquired in addition to the data string 105 after subsequent processing.

For the reproduced signal 104, as in FIG. 16, two threshold levels 107 and 108 are set to decide the sub-sampled data string points 105 at three levels. Specifically: the data points higher than the threshold level 107 are decided at "2"; the data points lower than the threshold level 108 are decided at "0"; and the data points between the levels 107 and 108 are decided at "1". According to these rules, there is produced an intermediate data string 109. By performing a modulo-2 operation (in which the intermediate values "2" and "0" are set to [0] whereas the intermediate value "1" is set to [1] on the intermediate data string 109, a data value determination of the sub-sampled data string points 105 to produce a mod 2 data string 111.

On the other hand, the data decision of the non-sampled data string points 106 is made according to the state transitions of the intermediate data string 109. With a transition between the intermediate values "2" and "0" the non-sampled data points during the transition are decided at [1], indicating edge data. At the transitions between the intermediate values "0" and "1", between "1" and "2", from "0" to "0", and from "2" to "2", on the other hand, the non-sampled data points during the transition are decided at [0] since they are not edge data. There is no possibility of occurrence of the transition from "1" to "1". By these rules, data value determinations of the non-sampled data string 106 points are executed to produce a transition decision data string 110. The data strings 110 and 111 are synthesized to produce a copy of the original data 112.

Figure 1:
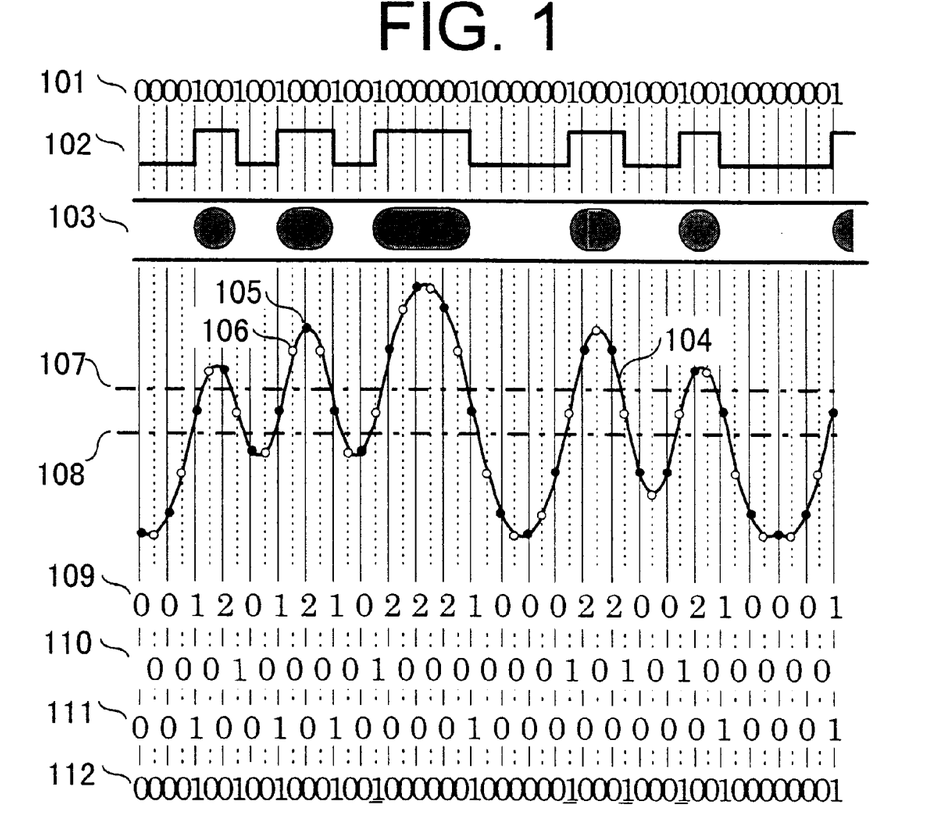
FIG. 1 is a diagram for explaining a concept of the data demodulating method in the invention.
Figure 2:
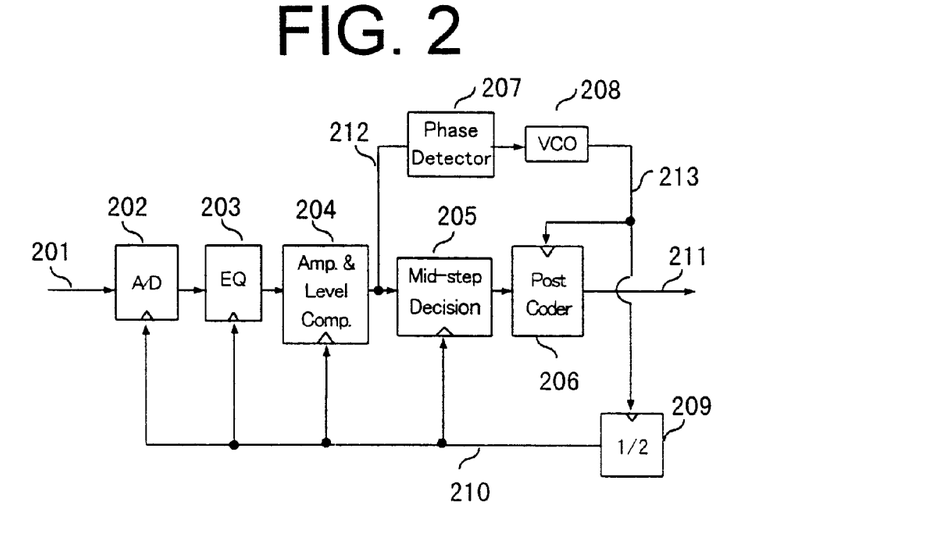
FIG. 2 is a block diagram showing a first embodiment of the invention.

With reference to FIG. 2, here will be described an example of the circuit construction for realizing the data demodulating operations shown in FIG. 1. A reproduced signal 201 is sampled with a half-frequency clock signal 210 by an A/D converter 202. This half-frequency clock signal 210 is produced by dividing a clock signal 213 into halves with a frequency divider 209. The A/D converted sampled data are cleared of an inter-symbol interference by a digital equalizer 203 and equalized to the PR (1, 2, 3, 3, 2, 1) characteristic, and are then cleared of the amplitude fluctuations and the level fluctuations by an amplitude/level compensator 204 until they are fed to an intermediate decider 205. All the operations in this meanwhile are executed in synchronism with the half-frequency clock signal 210. Sampled data 212 having passed through the amplitude/level compensator 204 are sent to a phase comparator 207, in which a discrepancy in the sampling timing of the A/D conversion is detected as a voltage change so that the clock signal 213 is acquired by controlling the oscillatory frequency of a VCO (Voltage Control Oscillator) 208. The intermediate value decider 205 makes decisions at three values "2", "1" and "0" with two (not-shown) threshold levels. The intermediate data, as decided at the three values, are sent to a post coder 206, and final reproduced data 211 are outputted in synchronism with the clock signal 213.

Figure 4:
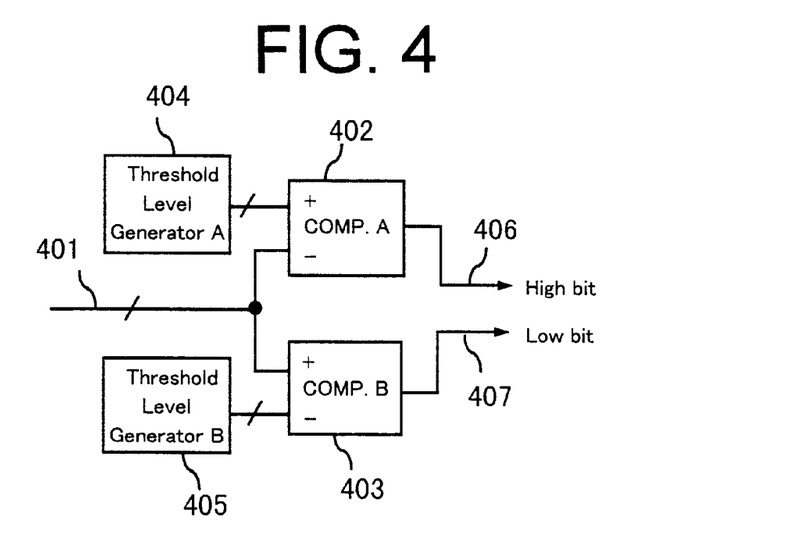
FIG. 4 is a block diagram showing an example of the configuration of an intermediate value decider.

An example of the construction of the intermediate value decider 205 will be described with reference to FIG. 4. Digital data 401 are outputted from the amplitude/level compensator 204 and inputted to the inverted input of a digital comparator A 402 and the uninverted input of a digital comparator B 403. To the uninverted input of the digital comparator A 402, there is inputted from a digital comparator A threshold generator 404 threshold data corresponding to the threshold value 107. To the inverted input of the digital comparator B 403, there is inputted from a digital comparator B threshold generator 405 threshold data corresponding to the threshold value 108. Here, the set values of the threshold values 107 and 108 can be changed from the outside through the generators 404 and 405. The digital comparator A 402 outputs a logic level "H", when the input data 401 are higher than the threshold data 107, and a signal (D1) 406 at a logic level "L" when equal to or lower than the same. Likewise, the digital comparator B 403 outputs the logic level "H", when the input signal 401 is higher than the threshold data 108, and a signal (D0) 407 at the logic level "L" when equal to or lower than the same. The number of levels "H") of the signals D1 and D0 is employed as the decision data: the sampled data over the threshold value 107 are decided at "2" for D1=D0="H"; the sampled data below the threshold value 108 are decided at "0" for D1=D0="L"; and the sampled data between the threshold values 107 and 108 are decided at "1" for D1="L" and D0="H".

Figure 3:
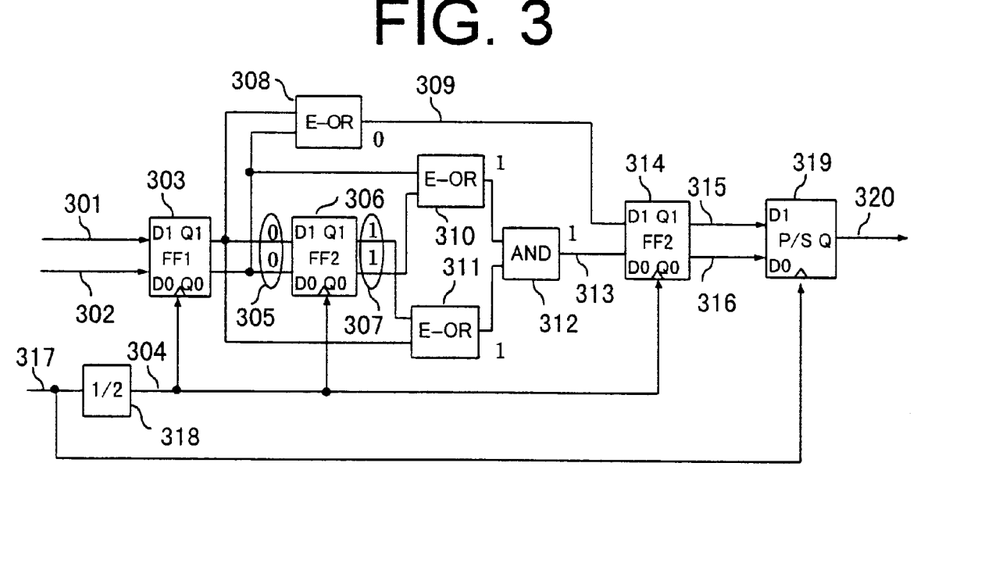
FIG. 3 is a block diagram showing an example of the configuration of a post coder.

An example of the construction of the post coder 206 will be described with reference to FIG. 3. Of the ternary decision results to be output from the intermediate value decider 205, the signals DI and DO are input as 301 and 302, respectively, to a flip-flop (FF) 303. The signals D1 and DO are latched with a half-frequency clock signal 304, as prepared by dividing a clock signal 317 into halves by a frequency divider 318, and are fed to an FF 306 at the next step. These data (305) are latched to data (307) with the half-frequency clock signal 304 in the FF 306. The high and low order bits of the data (305) are fed to an exclusive OR gate 308. The operations of the exclusive OR output the level "L", when both of the two input data are at the levels "H" or "L", and the level "H" when either are at the level "L". The level "L" is output when the data (305) are at "2" and "0", whereas the level "H" is output (to 309) when at "1".

On the other hand, the data (305) and the data (307), as delayed at the half-frequency clock interval by the FF 306, are employed to decide the non-sampled data points. The criteria for determining the non-sampled data points at "1" for the transition from the data (305) to the data (307) is that the high order bit and the low order bit change either from the level "L" to the level "H" or from the level "H" to the level "L". In this embodiment, therefore: the low order bits of the data (305) and the data (307) are input to an exclusive OR gate 310; the low order bit is input to an exclusive OR gate 311; and the result is input to an AND gate 312. The output (313) of he AND gate 312 takes the level "H", only when both the exclusive OR gates 310 and 311 take the level "H", and otherwise the level "L", so that the determinations of the non-sampled data points are correctly executed. The values resulting from the sub-sampled data string are fed as the output of the exclusive OR gate 308 to an FF 314 whereas the values resulting from the non-sampled data train is fed as the output of an AND gate 313 to the FF 314. The two results are latched with the half-frequency clock signal 304 and are output as data (315) and data (316) The operations thus far described are made In synchronism with the half-frequency clock signal 304. The data (315) and (316) are fed to a parallel/serial (P/S) converter 319 of 2 bits and are converted into serial data with the clock signal 317 to form reproduced data 320.

Figure 5:
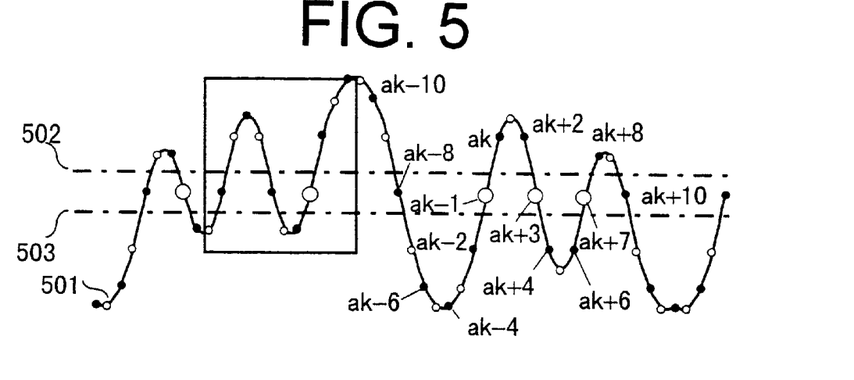
FIG. 5 is a conceptual diagram for explaining the operation of an amplitude/level compensator.

The operation of the amplitude/level compensator 204 will be described with reference to FIG. 5. A data train, as sampled from a reproduced signal 501 with the half-frequency clock, is indicated by ●, and its level is indicated by ak (where k is a suffix indicating the time). The non-sampled data ak+1 are estimated by taking a mean value between the sub-sampled data ak and ak+2. A candidate for the edge data is selected by deciding whether or not the sub-sampled data ak and the non-sampled data ak+1 are between threshold levels 502 and 503. In the example of FIG. 5, five data ak−8, ak−1, ak+3, ak+7 and ak+10 become the candidates for the edge data. The levels are compensated to the reference level of the A/D converter by taking a simple average from those data to determine the reference level of the reproduced signal 501 and by subtracting the reference level from the sub-sampled data. Here, the number of edge data at the time of determining the reference level depends on a design requirement to be determined by considering the servo band of the level compensation.

Here will be described the amplitude compensating operations. In this embodiment, the amplitude fluctuation is suppressed by calculating the gradient of the edge portion to control the gain so that the gradient may be substantially constant. Specifically, the operations are executed by setting the level difference between the sub-sampled data ak−2 and ak, ak+2 and ak−4, and ak+6 and ak+8 as a gradient Gj so that a target gradient G0 divided by the value Gj determines a gain compensation amount Gi. The servo band of the amplitude compensation is determined as in the level compensation by using a mean value G of a plurality of gradient data Gj. The sub-sampled data are multiplied by the mean gain compensation G determined, to compensate the amplitude fluctuation. Here in this example, the resolution of a pit having a length of 3T is lower than that of a bit having a length of 4T, and the level differences between ak−2 and ak and between ak+2 and ak+4 and the level difference between ak+6 and ak+8 are different so that the individual amplitude values are dispersed for the target amplitude by the probability of the length of the pits in the recording data. However, the invention raises no problem because what is required of the invention is not to compensate all the dispersions but to follow the amplitude fluctuation due to the sensitivity fluctuation of on track of a recording medium or the fluctuation of the focus servo of an optical spot. In the run-length limited code of the (2, 7) RLL modulation, the frequency of occurrence of short pits is high so that the mean value of the amplitude of 3T is compensated to approach the target amplitude.

Figure 6:
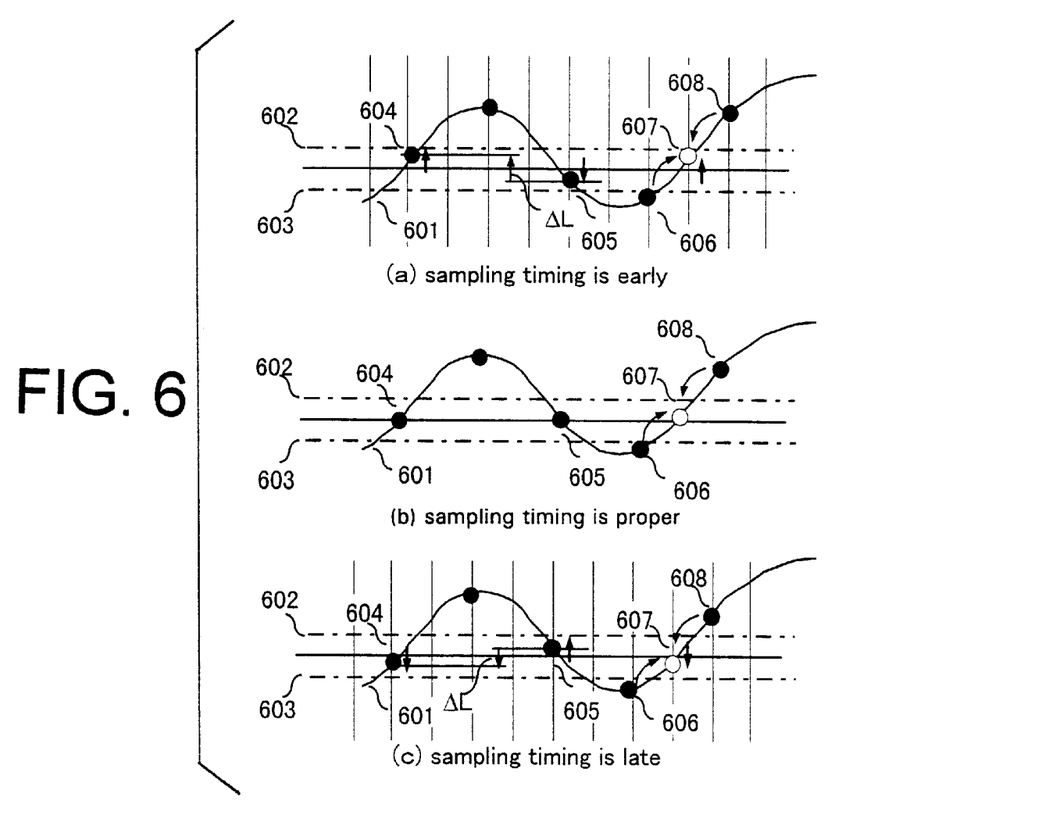
FIG. 6 is a conceptual diagram for explaining the operation of a phase comparator.

The operation of the phase comparator 207 will be described with reference to FIG. 6. FIG. 6 illustrates the inside of the frame of FIG. 5, as used for describing the amplitude/level compensating operations, in an enlarged scale on the time axis. The symbols ●indicate the sub-sampled data. FIG. 6(b) shows the case in which a reproduced signal 601 is sampled at a proper timing. Sampled data 604 and 605 are edge data coincident with the reference level. When the sampling timing is advanced for the reproduced signal 601, on the other hand, the level of the data 604 corresponding to the leading edge shifts upward whereas the data 605 corresponding to the trailing edge shifts downward, as shown in FIG. 6(a). When the sampling timing is delayed for the reproduced signal 601, on the contrary, the level of the data 604 corresponding to the leading edge shifts downward whereas the data 605 corresponding to the trailing edge shifts upward, as shown in FIG. 6(c). Specifically, If a level difference ΔL between leading edge data L (front) and trailing edge data L (rear), as sequentially detected, is defined as L(front)—L(rear), the level difference ΔL indicates the phase difference between the clock signal and the reproduced signal, as including the polarities. The phase comparator outputs the level difference ΔL as a phase error and feeds it to a VCO 208 at the next step. It can be easily decided from the level relation between the leading and trailing sampled data whether or not the sampled data are at the leading and trailing edges. For example, the fact that the data 605 belongs to the trailing edge can be decided from the fact that the sampled data on and before the data 605 are higher than the data 605 and that the succeeding data 606 are lower than the data 605. Here, the leading edge data and the trailing edge data are discarded when they cannot be detected in pairs. Since the level difference ΔL is easily changed with the amplitude of the reproduced signal, the output of the phase comparator 207 is normalized with the target amplitude which is set by the amplitude compensating operations described before. In the description thus far made, it is assumed that the edge data belong to the sub-sampled data. When the non-sampled data between the sub-sampled data 606 and 607 is an edge data, however, the level of the edge data is estimated by taking an arithmetical mean between the data 606 and 607, and the level difference ΔL is determined in the aforementioned procedure.

Figure 7:
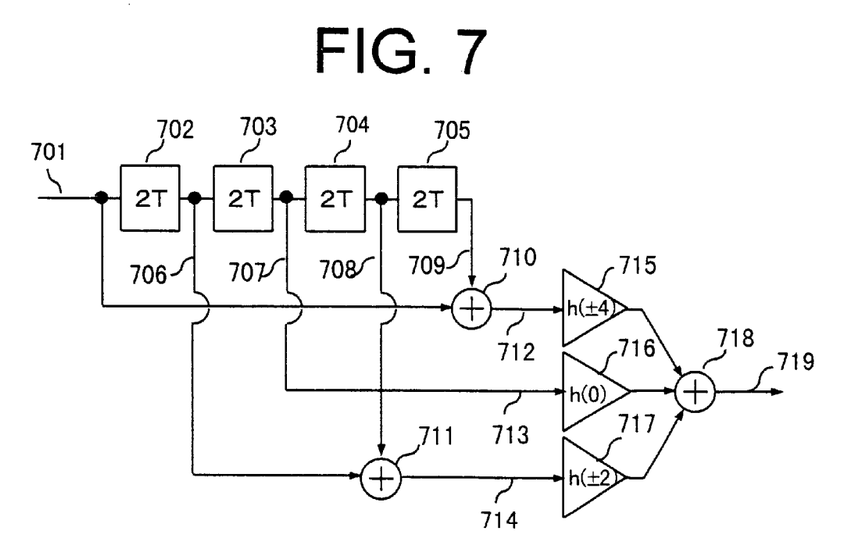
FIG. 7 is a block diagram showing an example of the configuration of an equalizer.

The operation of the equalizer 203 will be described with reference to FIG. 7. This equalizer 203 is constructed to include delay circuits 702 to 705 employing FF or the like, an adder and a multiplier. The digital signals, as sequentially delayed by 2 clocks by the delay circuits, are designated by 701, 706, 707, 708 and 709. The ordinary equalizer is equipped with multipliers for the individual digital signals 701 to 709. In this embodiment, the digital signals 701 and 709, and 706 and 708 are constructed to be multiplied by equal coefficients so as to suppress the shift due to the reduction in the circuit scale and the asymmetric setting of the coefficients of the multipliers. As a result, the addition of the digital signals 701 and 709 is carried out by the adder 710, and the addition of the digital signals 706 and 708 is carried out by an adder 711 to produce digital signals 712 and 714. These digital signals 712, 714 and 713 are multiplied by coefficients h(±4), h(0) and h(±2) by multipliers 715, 717 and 716, and the results are fed to an adder 718 to produce an equalized output 719. The coefficient values of the multipliers 715, 717 and 716 can be set from the outside and adaptably set to fit the target reproduced channel characteristics.

Figure 8:
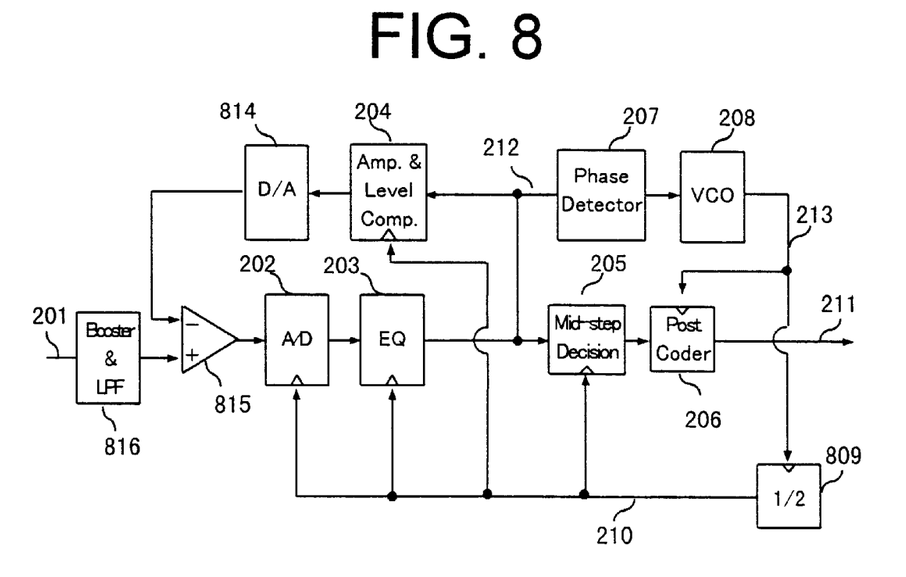
FIG. 8 is a block diagram showing a second embodiment of the invention.

A second embodiment of the invention will be described with reference to FIG. 8.

This embodiment is different from the first one shown in FIG. 1 with regard to the construction of the equalizer and the amplitude/level compensator. This difference will be described, but the description of the remaining portions will be omitted. The reproduced signal 201 passes an analog equalizer 816 to emphasize the amplitude characteristics in the high frequency range. As a result, the amplitude of the shortest mark is emphasized to prevent the signal component from being buried in noise by the quantization error of the A/D converter 202 when it is sampled by the A/D Converter. The equalizing conditions at this time may be coarse given the PR (1, 2, 3, 3, 2, 1) characteristic at the digital equalizer 203 further downstream. The output signal of the analog equalizer 816 is fed through a differential amplifier 815 to the A/D converter 202. The output of the digital equalizer 203 is fed to the amplitude/level compensator 204 so that the compensated gain and the mean DC level of the sampled data are detected and individually converted by D/A converter 814 into analog signals. The compensated gain is inputted as the gain setting voltage of the differential amplifier 815 to the inverted voltage whereas the mean DC level is inputted to the same. As a result, the reproduced signal is passed to the differential amplifier 815 and the amplitude and level are compensated with the target amplitude around the reference level of the A/D converter 202, to the A/D converter 202.

A third embodiment of the invention will be described with reference to FIGS. 9A–9C.

This embodiment is different from the first and second embodiments with regard to the operation of the intermediate value decider. In the first and second embodiments, the intermediate value decider is constructed to include the two comparators, as shown in wig. 4, to perform the simple ternary decisions. In this embodiment, on the other hand, the non-sampled data are estimated from the sub-sampled data so that the ternary decisions of the data dk are executed from the ternary decision results of the three sub-sampled data dk−1, dk and dk+1 in addition to the sampled data.

Figure 10:
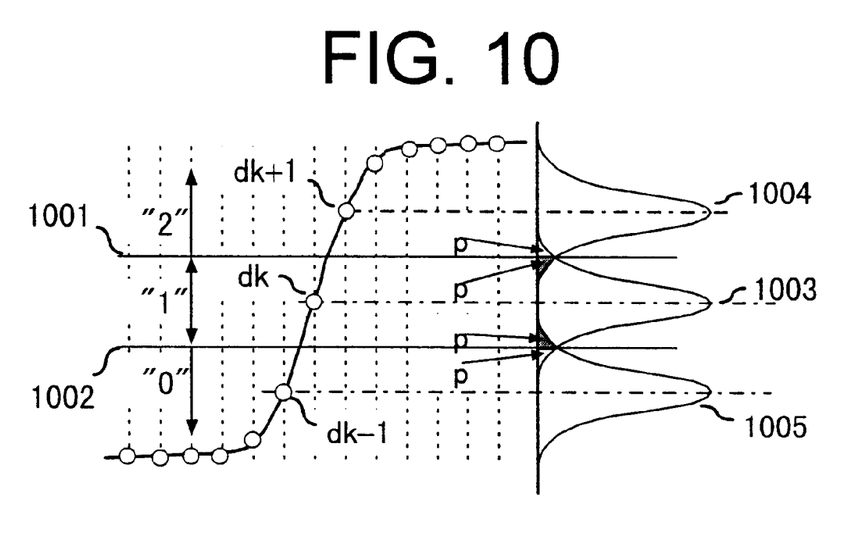
FIG. 10 is a principle diagram of a data demodulating method in the third embodiment of the invention.

The principle of this embodiment will be described with reference to FIG. 10.

Let the data of the edge portion be designated at dk and the data before and after at dk−1 and dk+1. The data dk−1, dk and dk+1 are those to be decided at "0", "1" and "2", respectively. By compensating the baseline function of the sampled data with noise, the distribution of the generation frequency of the data dk is changed into one 1003. Likewise, the data dk+1 and dk−1 take distributions 1004 and 1005, respectively.

The detection levels of the individual data have no correlation so that the occurrence frequency distributions take the same shape as that caused by the noise level. The probability for exceeding threshold levels 1001 and 1002 is set at p. The probability for the case in which the data cannot be correctly decided at "1" by the ternary decision of the data dk is 2p because it is the sum of the erroneous decisions at "0" and "2". At this Lime, the edge is not detected yet. When the data dk+1, are decided at "1" whereas the data dk are decided at "0" or "2", this is an error in which he edge position is moved from the instant k to the instant k+1. This probability is $2p^2$. In accordance with the method of deciding the data dk in consideration of the decision results of the data dk−1 and dk+1, on the other hand, the data dk are decided at "1" even if impossible, if the data dk−1 and dk+1 are correctly decided at "0" and "2". According to this decision method, the probability for the erroneous decision of the data dk is determined at $4p^2-2p^3$ from the product of the probability of 2p for the erroneous decision of the data dk and the probability of $2-p^2$ for the incorrect decision of at least one of the data dk−1 and dk+1 at "0" and "2". When the error factor (2p) due to the ternary decision of the data dk is a second minus power of 10, for example, the error probability $(4p^2-2p^3)$ is reduced to a fourth minus power of 10 so that the error factor can be effectively reduced by two figures.

Figure 9A:
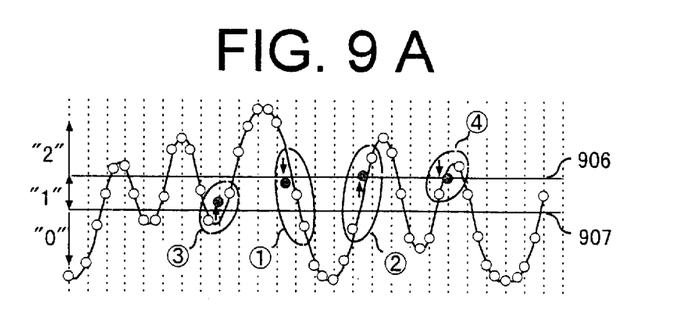
FIG. 9A is a diagram of sampled clock data according to a third embodiment of the invention.

FIG. 9A shows one example of the sub-sampled data which are sampled with the clock signal, and here will be described a block diagram (of FIG. 9B) illustrating the operation of the ternary decision using the sub-sampled data. As shown in FIG. 9A: the sub-sampled data between threshold values 906 and 907 are decided as "1"; the sub-sampled data over the threshold value 906 are decided as "2"; and the sub-sampled data below the threshold value 907 are decided as "0". These decisions are executed by a ternary decider 917. Sub-sampled data 901 are input to a digital comparator A 902 and a digital comparator B 903, and the threshold values 906 and 907 are outputted from a comparator A threshold generator 904 and a comparator B threshold generator 905. The data of 2 bits, which have the high and low order bits of the output 908 of the comparator A 902 and the output 909 of the comparator B 903, are the ternary decision results. A shift register 910 stores at all times he ternary decision results ak−1, ak and ak+1 of the three sub-sampled data by setting the ternary decision result at the instant k to ak, and the stored ternary decision results are sequentially carried rightward in synchronism with the sampled clock. For the three decision results ak−1, ak and ak+1 stored in the shift register 190, a decision result compensator 911 compensates the decision result ak to "1", when the decision results ak−1 and ak+1 are individually at "0" and "2" or at "2" and "1" and when the decision result ak is other than "1". This example corresponds to a case of FIG. 9A. For the ternary decision results thus compensated, a post coder 912 operates the exclusive OR for the high and low order bits of the ternary decision results to output the reproduced data.

In the decision method described above, a situation of misjudgment of "1" may occur if the sampled data dk failing to correspond to the edge data comes into the range of the threshold value under the influence of the noises. This is exemplified by cases 1, 3 and 4 of FIG. 9A. When the data dk are decided as "2" or "0" at this time, the reproduced data at the instant k should be at [0] but they are misjudged as [1]. This is an error in which the reproduced data are shifted back and forth by 1 bit. In this embodiment, therefore, there is added a function block for confirming the sampled data decided at the intermediate level "1". The sampled data to be decided at the intermediate level "1" have to be the data of the edge portion. In order to realize this necessity in a simple circuit, it is arbitrarily decided by determining a mean DC level of 3 bits that this level is between the threshold values 906 and 907. By this averaging operation, the influence of noise is damped to solve the problem which occurs as the sampled data at the instant k shifts between the threshold values to cause an erroneous decision at "1". This erroneous decision at "1" as a result of the averaging operation occurs when the noise is overlapped in the same direction and in the same quantity as that of the instant k. This probability can be expected to be as small as a third power of p.

The sub-sampled data 901 are fed to a shift register 915 through a delay circuit 914 which is provided for timing adjustment. The sub-sampled data dk−1, dk and dk+1 at the instant k and the before and after instants k−1 and k+1 are stored in the shift register 915 and are sequentially moved rightward. The mean value of the sub-sampled data at the instant k is operated by a mean level operator 916 and is outputted to the ternary decider 917 so that the ternary decisions are executed for the mean level. This decision result is fed to the decision result compensator 911 to compensate the result ak, as decided at "1", to "0" or "2".

Figure 9B:
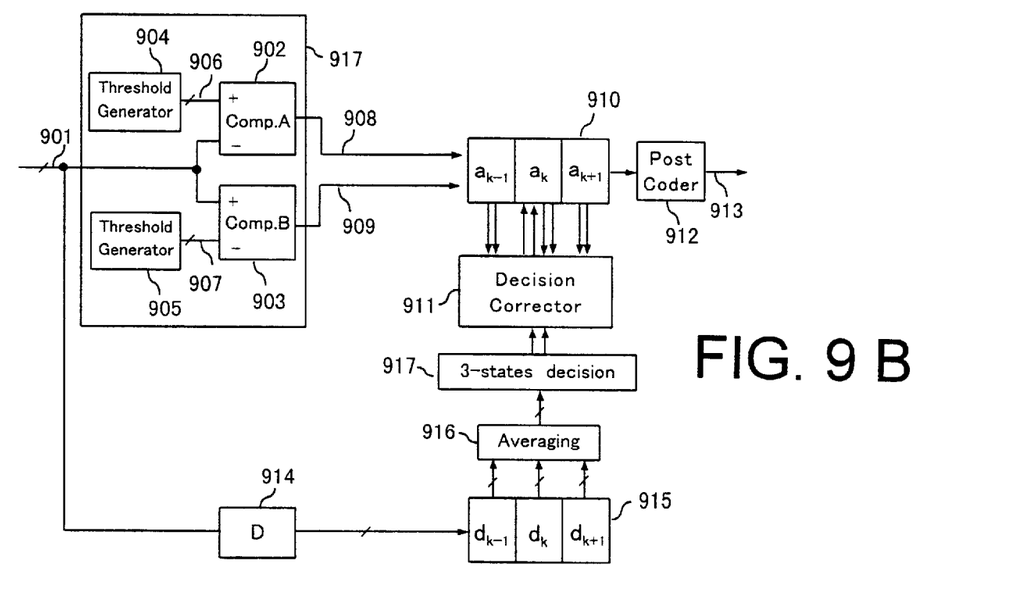
FIG. 9B is a block diagram for explaining the third embodiment of the invention.
Figure 9C:
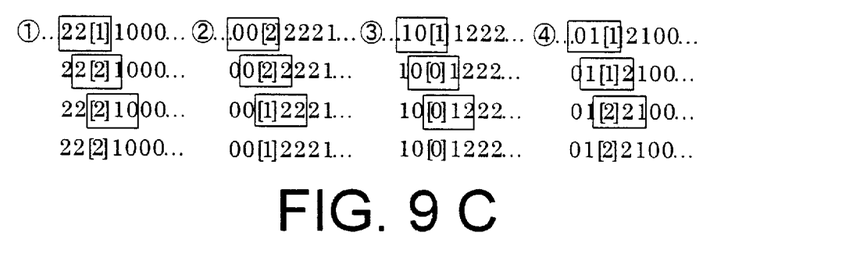
FIG. 9C is a table of data useful for expelling the third embodiment of the invention.

For the cases from 1 to 4, as shown in FIG. 9A, the flows of the ternary decisions will be summarized in FIG. 9C. A numeral string from the case 1 to the case 4 is the decision result which is acquired by the ternary decider 917. The decision results, as designated by [ ], indicate the misjudged bits, and the decision results, as designated by □, indicate that they are stored in the shift register. Referring to case 1, when the contents of the shift register is 22 [1], the value [1], is compensated to the value [2], as indicated at the second step. Referring to case 2, when the contents of the shift register is 0 [2] 2, step 2, the value [2] is compensated to the value [1], step 3, because the decision results before and after are at "0" and "2". In case 3, when the contents of the shift register is 10 [1], the value [1] is compensated to the value [0], as indicated at the second step. In case 4, when the content of the shift register is 1 [1] 2, step 2, the value [1] is compensated to the value [2], as indicated at the third step.

The method of reproducing the data from the sub-sampled data, as obtained with the clock signal, has been described in detail hereinbefore. The sampling with the half-frequency clock signal can be realized by estimating the non-sampled data by the interpolation from the sub-sampled data and by performing the aforementioned ternary decisions employing the three sub-sampled data dk−1, dk and dk+1 together with the estimated non-sampled data. When the ternary decisions of the data dk are to be executed from the ternary decisions of the three sub-sampled data dk−1, dk and dk+1 together with the sub-sampled data which are made by estimating the non-sampled data by the interpolations from the sub-sampled data sampled with the half-frequency clock signal, a deterioration in the SN ration of the non-sampled data by the interpolations is anticipated, but this does not raise a problem, as will be described in the following.

Now, assuming that the data dk−1 and dk+1 are those which are sampled with the half-frequency clock signal, and it is considered that the data dk are to be estimated from their mean value. It is thought that the detection level of the sub-sampled data dk−1 and dk+1 are a probability variable, and It is assumed that the mean values are individually at dk−1 and dk+1 and that the dispersion values conform to a normal distribution $\sigma$. That is, the probability variables dk−1 and dk+1 conform to the probability distributions P(dk−1, $\sigma^2$) and P(dk+1, $\sigma^2$). It is indicated that the mean value dk of the data dk−1 and dk+1 conforms to the probability distribution P ((dk−1+dk+1)/2, $\sigma^2$/2).

This is apparent from the solution of Problem 13 (3) of Section 7 "Means Value and Dispersion" of "Introduction to Statistics (edited by Kameo Matsushita and published by Iwanami), for example. Specifically, the dispersion value of the data dk is $1/\sqrt{2}$ (=0.707) of the dispersion value $\sigma$ of the data dk−1 and dk+1. As a result, the SN ratio is not deteriorated but rather improved by taking the mean value.

Figure 11:
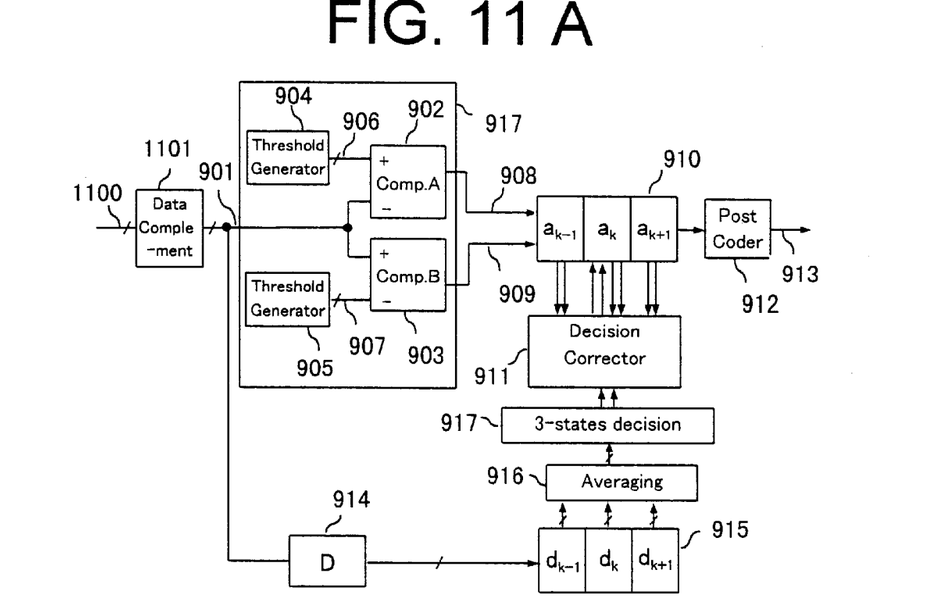
FIG. 11A is a block diagram showing an example of the circuit construction according to the third embodiment of the invention.
FIG. 11B is a block diagram showing another example of the circuit construction according to the third embodiment of the invention.

A specific circuit construction for the ternary decisions from the sub-sampled data sampled with the half-frequency clock signal is shown in FIGS. 11A and 11B. FIG. 11A shows the case in which the non-sampled data are determined in a sub-sampled data interpolator 1101 from the sub-sampled data 1100 obtained with the half-frequency clock signal, and the subsequent operations are absolutely identical to those of the construction shown in FIG. 9B so that their detail description will be omitted.

FIG. 11B provides a construction in which the sub-sampled data 1100 obtained with the half-frequency clock signal are subjected to the ternary decisions, as in FIG. 9B, and in which the results are compensated. A shift register 1110 for storing the ternary decision results is stored with the decision results of every two other bits such as ak<2, ak and ak+2. Likewise, a shift register 1115 is stored with the sampled data of every two other bits such as dk−2, dk and dk+2, which are fed to a weighted sampled mean data operator 1116. The decision of whether or not the data are the edge data requires the sub-sampled data dk−1 and dk+1, as described with reference to FIGS. 9A–9C, and is made in this embodiment from the mean values between the data dk−2 and dk and between dk and dk+2. Specifically, dk−1= (½)dk−2+(½)dk, and dk−1=(½)dk+(½)dk+2, so that the mean value of dk, dk−1 and dk+1 is (⅙)dk−2+(⅔)dk+(⅙) dk+2, Thus, the weighting of 1:4:1 is made for averaging dk−2, dk and dk+2. Otherwise, the construction is absolutely identical to that shown in FIG. 9(b), and its detailed description will be omitted.

Figure 12:
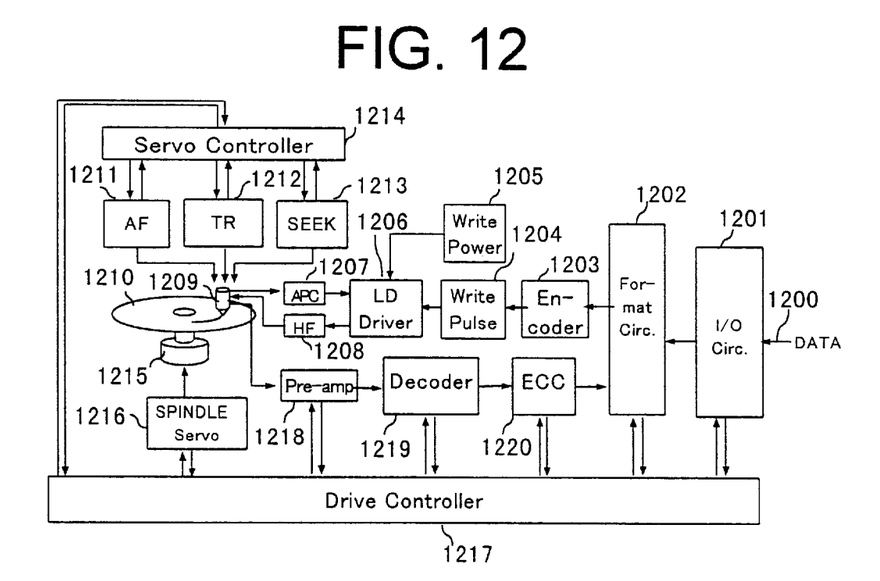
FIG. 12 is a block diagram of the entirety of the case in which the data demodulating of the invention is applied to an optical disk device.

With reference to FIG. 12, here will be described in detail an embodiment of the case in which a data demodulating method of the present invention is applied to an optical disk device. The modes of the optical disk can be exemplified by not only a ROM type such as the CD or CD-ROM but also the RAM type employing a phase changing medium or an optical magnetic medium. Here will be described the ROM disk and the RAM disk employing the phase changing medium.

User data 1200 are fed through an interface 1201 (i.e. SCSI) to a format circuit 1202, in which a variety of format patterns at the time of recording on the optical disk are added to the user data, until these user data are fed to encoder 1203. In this encoder 1203, the user data are converted into channel data having run-length limitations such as (2, 7) RLL, EFM or 8/16 modulations, and error compensating code data are added to the user data and fed to a next step. A write pulse generator 1204 generates write pulses for forming a recording mark so that the channel data [1] may be positioned at the leading edge and the trailing edge of the pit. A laser driver 1206 feeds the drive current to the (not-shown) semiconductor laser in an optical head 1209 in accordance with the pulse train, which is fed from the write pulse generator 1204, and the set value of the power which is fed from a write power setter 1205. As a result the light emission power is modulated by the drive current, a desired recording pit is formed in the recording region of the user data over an optical disk 1210. An automatic power control (APC) circuit 1207 controls the fluctuation of the power level at the data reproducing time, and a high-frequency superposition (HF) circuit 1208 suppresses the laser noise or the fluctuation of the semiconductor laser oscillation.

In response to a command from a servo controller 1214, a focus control 1211, a tracking control 1212 and a seek control 1213 cause the focused spot, as emitted from the optical head 1209, to follow the recording track over the optical disk 1210. A spindle motor 1215 s controlled by a spindle motor control 1216 to control the number of revolutions of the optical disk. The servo controller 1214 and the spindle motor control 1216 are controlled by a drive controller 1217.

At data reproduction time, a signal from the (not-shown) optical detector in the optical head 1209 is fed through a preamplifier 1218 to a data demodulator 1219. This data demodulator 1219 demodulates the data [1] corresponding to the leading edge and the trailing edge by the data demodulating method, as described above, and feeds it to an error compensation circuit (ECC). In this ECC 1220, the error, as having occurred in the demodulated data, is detected and compensated with an error compensation code. The reproduced channel data, as compensated, are fed to the format circuit 1202 and are then returned to the original user data by removing the additional pattern, and this user data are fed to the user data interface 1202.

Although a series of operations of the optical disk device from the recording operation to the demodulating operation have been described hereinbefore, the detailed operations are slightly different between the case in which the optical disk 1210 is of the ROM type dedicated to reproduction and the case in which the same is of the reprogrammable RAM type.

In the disk of the ROM type, the data to be reproduced from the disk are already formed as a pit train so that the reproduced signal is always fed through the preamplifier 1218 to the data modulator 1219. On the other hand, the disk of the RAM type is usually managed in a unit of data called "sectors" with some sectors having no recorded data. In the optical disk of the RAM type, the user data are recorded/ reproduced by reading the address information as the pre-pit information at the head portion of the sector. To the data modulator 1219, therefore, the pre-pit information and the reproduced signals of the data which are recorded in the sectors are discontinuously fed through the preamplifier 1218. Thus, the known data patterns are buried in the pre-pit information and in the head of the sector data so that the data demodulating acquisition mode is ended in that region. This operation will be called the "initial mode", and the subsequent operations will be called the "ordinary mode".

Figure 13:
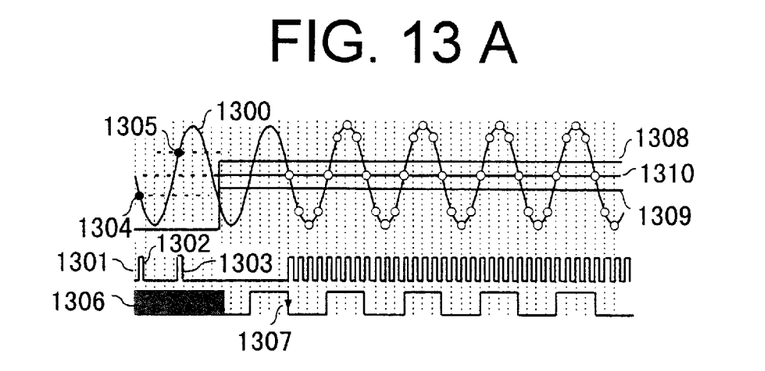
FIG. 13A is a diagram for explaining the initial mode in the data demodulating of the invention.
FIG. 13B is a further diagram for explaining the initial mode in the data demodulating of the invention.

FIGS. 13A and 133 show the initial mode of the data demodulating. The known data pattern is a repetition of 4T pits/4T space. The sampling case with the channel clock signal is shown in FIG. 13A, and the sampling case with the half-frequency clock signal of the channel clock signal is shown in FIG. 13B.

In response to a reproduced signal 1300 having passed the preamplifier, as shown in FIG. 13A, in the initial mode, a sample clock 1301 samples the reproduced signal with paired pulses 1302 and 1303 at an interval of 4T to produce sampled data 1304 and 1305. The signal source of the sample clock 1301 is acquired by causing the clock signal, as oscillated at the center oscillation frequency, to pass the counter. Since the mean level of the sampled data 1304 and 1305 is coincident with the center level of the reproduced signals it is employed as the slice level to make the reproduced signal 1300 binary to produce a pulse signal 1306. By interrupting the oscillation of the VCO until the pulse signals are output in a stable manner, and by starting the oscillations again at a falling timing 1307 of the pulse signal 1306, it is possible to produce a sample clock 1301 which has no phase difference from the reproduced signal. After this, the sampled data of the reproduced signal 1300 are obtained, and the detection of the edge data is started from the sampled data with threshold values 1308 and 1309. From the detected edge data, the phase locked loop control and the controls for compensating the level fluctuation and the amplitude fluctuation are started. A center level 1310 is obtained as the mean level of the detected edge data so that the threshold levels 1308 and 1309 are finely adjusted with reference to the center level.

In response to the reproduced signal 1300 having passed the preamplifier, as shown in FIG. 13B, in the initial mode, the sample clock 1301 samples the reproduced signal with paired pulses 1302 and 1303 at the interval of 4T to produce sampled data 1304 and 1305. The signal source of the sample clock 1301 is acquired by dividing the frequency of the clock signal, as oscillated at the center oscillation frequency, into halves and by causing the clock signal to pass the counter. Since the mean level of the sampled data 1304 and 1305 is coincident with the center level of the reproduced signals, it is employed as the slice level to make the reproduced signal 1300 binary to produce the pulse signal 1306. By interrupting the oscillation of the VCO till the pulse signals are stably outputted and by starting the oscillations again at the falling timing 1307 of the pulse signal 1306, it is possible to produce the sample clock 1301 which has no phase difference from the reproduced signal. After this, the sampled data of the reproduced signal 1300 are obtained, and the detection of the edge data is started from the sampled data with threshold values 1308 and 1309. From the detected edge data, the phase locked loop control and the controls for compensating the level fluctuation and the amplitude fluctuation are started. The center level 1310 is obtained as the mean level of the detected edge data so that the threshold levels 1308 and 1309 are finely adjusted with reference to the center level.

In the initial mode, in order to shorten the settling time period, the servo band of the control of the phase locked loop and the compensation control of the level/amplitude fluctuation is widened in a specific pattern portion to enlarge the gain so that the acquisition mode is ended until the user data region comes in. After this, the settings of the band and the gain are switched to bring the processing into the ordinary mode in the user data region thereby stabilizing the data decoding operation.

In the case of the ROM type disk, on the other hand, the data demodulation is carried out by the processing in the ordinary mode because the reproduced signal is not interrupted.

The sampled data of the edge data portion and the sampled data before and after the former are subjected to the decisions at the ternary levels including the edge level and the levels higher and lower the edge level in accordance with the two threshold levels. The decoded data [1] are outputted by employing the sampled data as the edge data when the sampled data are at the edge level and when the sampled data are not at the edge level and the sampled data before and after the former are at levels higher and lower than the edge level. As a result, there is improved the probability in which the sampled data can be correctly demodulated to the value [1] even when the sampled data are caused to exceed the threshold value by noises. This makes it possible to expect the effect of the SN relief.

The ternary decisions are made by performing the thinned-out sampling in response to the sampling signal which is formed by dividing a clock signal into halves. As a result, the processing speed of the most complicated decider can be lowered to one half as high as that of the prior art, and only the portion for demodulating the reproduced data need be performed at the speed of the clock. Thus, there are attained advantages that a high speed data transfer can be easily coped with, and that the semiconductor process of the prior art can be employed in the LSI.

In addition, by using a method in which the level fluctuation and the amplitude fluctuation accompanying the reproduced signal are digitally detected from the sampled data series and are compensated with respect to the analog reproduced signal or the sampled data string, the reliability of the data demodulating is improved.

Further, a stable data demodulation can be performed for not only the ROM type disk but also the RAM type disk by ending the acquisition mode utilizing the specific pattern formed at the head of the recording data portion and by restoring the ordinary mode at the user data portion.

While preferred embodiments have been set forth with specific details, further embodiments, modifications and variations are contemplated according to the broader aspects of the present invention, all as determined by the spirit and scope of the following claims.

We claim:

1. A method for reproducing an optical disk device comprising the steps of:

producing a reproduced clock signal;

sampling a reproduced signal with a half-frequency of the reproduced clock signal;

reproducing a data from the reproduced signal which is sampled.

2. A method for reproducing an optical disk device according to claim 1, wherein the reproduced signal is sampled with a half-frequency clock signal.

3. A method for reproducing an optical disk device according to claim 2, wherein the half-frequency clock signal is produced by dividing the reproduced clock signal into halves with a frequency divider.

* * * * *